US012652728B2

(12) United States Patent
Cabeza Gozalo et al.

(10) Patent No.: US 12,652,728 B2
(45) Date of Patent: Jun. 9, 2026

(54) COOKING HOB ACCESSORY DEVICE

(71) Applicant: BSH Hausgeräte GmbH, Munich (DE)

(72) Inventors: Tomas Cabeza Gozalo, Saragossa (ES); Javier Lasobras Bernad, Ejea de los Caballeros (ES); Sergio Llorente Gil, Saragossa (ES); Julio Rivera Peman, Cuarte de Huerva (ES)

(73) Assignee: BSH Hausgeräte GmbH, Munich (DE)

( * ) Notice: Subject to any disclaimer, the term of this patent is extended or adjusted under 35 U.S.C. 154(b) by 713 days.

(21) Appl. No.: 18/021,210

(22) PCT Filed: Aug. 2, 2021

(86) PCT No.: PCT/EP2021/071528

§ 371 (c)(1),
(2) Date: Feb. 14, 2023

(87) PCT Pub. No.: WO2022/048836

PCT Pub. Date: Mar. 10, 2022

(65) Prior Publication Data

US 2023/0328850 A1 Oct. 12, 2023

(30) Foreign Application Priority Data

Sep. 2, 2020 (EP) .................................... 20382780

(51) Int. Cl.
*H05B 6/06* (2006.01)

(52) U.S. Cl.
CPC ......... *H05B 6/062* (2013.01); *H05B 2213/06* (2013.01)

(58) Field of Classification Search
None
See application file for complete search history.

(56) References Cited

U.S. PATENT DOCUMENTS

| | | | | |
|---|---|---|---|---|
| 2018/0110364 | A1 * | 4/2018 | Nam | H05B 6/44 |
| 2019/0327791 | A1 * | 10/2019 | Baldo | H05B 6/062 |
| 2020/0045781 | A1 | 2/2020 | Tadla | |
| 2022/0386423 | A1 * | 12/2022 | Jeong | G01R 19/25 |

FOREIGN PATENT DOCUMENTS

| | | | | |
|---|---|---|---|---|
| EP | 1708545 A2 | | 10/2006 | |
| EP | 3675597 A1 | | 7/2020 | |
| JP | 2012146423 A | | 8/2012 | |
| WO | WO-2014016032 A1 | * | 1/2014 | H05B 6/062 |
| WO | 2015028076 A1 | | 3/2015 | |

OTHER PUBLICATIONS

JP 2012-146423 A (Ishihara, Masahiro et al.) Aug. 2, 2012 [retrieved on Dec. 1, 2025]. Retrieved from Foreign Image and Text database, translation by Clarivate Analytics. (Year: 2012).*
International Search Report PCT/EP2021/071528 dated Oct. 25, 2021.

* cited by examiner

*Primary Examiner* — John J Norton
(74) *Attorney, Agent, or Firm* — Michael E. Tschupp; Andre Pallapies; Brandon G. Braun

(57) ABSTRACT

A cooktop accessory device includes a detection coil configured to detect an inductive signal of an induction heating unit, and a signal analysis unit configured to determine a parameter of the inductive signal.

15 Claims, 4 Drawing Sheets

COOKING HOB ACCESSORY DEVICE

CROSS-REFERENCES TO RELATED APPLICATIONS

This application is the U.S. National Stage of International Application No. PCT/EP2021/071528, filed Aug. 2, 2021, which designated the United States and has been published as International Publication No. WO 2022/048836 A1 and which claims the priority of European Patent Application, Serial No. 20382780.3, filed Sep. 2, 2020, pursuant to 35 U.S.C. 119(a)-(d).

BACKGROUND OF THE INVENTION

The invention relates to a cooktop accessory device and a method for operating a cooktop accessory device.

An item of cookware comprising a temperature sensor and comprising a communication interface for communication with a cooktop is already known from the prior art. An operating state of the cooktop can be transmitted wirelessly, for example by means of Bluetooth, from the cooktop to the communication interface of the item of cookware, whereby the temperature sensor can be switched on or off as a function of the operating state of the cooktop. The drawbacks of such a solution are a relatively high degree of technical complexity and high costs for the communication interface. Additionally, in the case of a use of the item of cookware with an induction cooktop, it can lead to errors and/or faults in the data transmission due to the electromagnetic alternating fields of the induction cooktop. It is also disadvantageous that a functionality of such an item of cookware is limited to such cooktops which are equipped with a suitable communication interface for communication with the item of cookware, whereby a flexibility is significantly restricted for a user.

BRIEF SUMMARY OF THE INVENTION

The object of the invention, in particular, is to provide a generic device having improved properties regarding efficiency.

A cooktop accessory device is proposed, comprising at least one detection coil which is provided to detect at least one inductive signal of at least one induction heating unit, in particular of a cooktop, and comprising a signal analysis unit which is provided to determine at least one parameter of the inductive signal.

A cooktop accessory device can be advantageously provided with a high degree of efficiency by means of such an embodiment. In particular, a cost efficiency can be advantageously improved relative to devices known from the prior art if the signal analysis unit determines at least one parameter of the inductive signal, since it is possible to dispense with units for transmitting the at least one parameter of the inductive signal from the cooktop, which has the induction heating unit, to the cooktop accessory device. Moreover, a cooktop accessory device can be provided with a high degree of flexibility for a user, which permits a particularly flexible use in combination with a plurality of induction heating units of different cooktops. Moreover, the parameter of the inductive signal, and therefrom the operating state of the induction heating unit, can be advantageously determined by particularly simple technical means and in a manner which is particularly reliable and with little susceptibility to error.

The cooktop accessory device is preferably a functional constituent part, in particular a structural and/or functional component, of a cooktop accessory. The cooktop accessory device can also encompass, in particular, the entire cooktop accessory. A cooktop accessory having the cooktop accessory device can be configured as an item of cookware, preferably as an induction item of cookware, for example as a cooking pot, in particular as an induction cooking pot, and/or as a pan, in particular as an induction pan or the like. Alternatively or additionally, the cooktop accessory having the cooktop accessory device can be configured as an underlay mat which could be provided, in particular, for positioning at least one item of cookware. The cooktop accessory having the cooktop accessory device is preferably provided for operation with the at least one induction heating unit, which in at least one operating state provides energy in the form of an electromagnetic alternating field, preferably for the purpose of an indirect or direct heating of the cooktop accessory.

The induction heating unit can be part of a cooktop, in particular an induction cooktop with a cooktop plate, on which the cooktop accessory having the cooktop accessory device can be positioned, in particular for the purpose of heating. Alternatively, the induction heating unit could be part of a cooking system which is arranged in an assembled state below a worktop, for example a kitchen countertop.

Preferably, the inductive signal is a signal which is induced in the operating state of the induction heating unit by the electromagnetic alternating field in the detection coil.

Preferably, the signal analysis unit is electrically conductively connected to the detection coil. Preferably, the signal analysis unit has a rectifier unit comprising at least one rectifier element, for example a rectifier diode, which is provided to convert the inductive signal, which is a bipolar signal with a periodically alternating electrical polarity, for example an alternating voltage and/or an alternating current, into a unipolar signal with only one electrical polarity. The unipolar signal can be, in particular, a pulsating and/or smoothed direct voltage and/or, in particular, a pulsating and/or smoothed direct current. Preferably, the signal analysis unit has at least one amplifier unit which can be configured, for example, as an operational amplifier. Preferably, the amplifier unit of the rectifier unit is electrically connected downstream and is provided to amplify the inductive signal converted by means of the rectifier unit into the unipolar signal. Alternatively, the amplifier unit of the rectifier unit could be electrically connected upstream and could be provided to amplify the inductive signal.

In the present application, numerical values such as for example "first" and "second" which are placed before specific terms, serve only for a differentiation between objects and/or an assignment of objects to one another and do not imply an existing total number and/or priority of objects. In particular, a "second object" does not necessarily imply the presence of a "first object".

"Provided" is intended to be understood to mean specifically programmed and/or designed and/or equipped. An object being provided for a specific function is intended to be understood to mean that the object fulfills and/or executes this specific function in at least one use state and/or operating state.

It is further proposed that the signal analysis unit is provided to determine an operating state of the induction heating unit by means of the parameter. By means of such an embodiment, a determination of the operating state of the induction heating unit can be advantageously achieved by particularly simple technical means. Preferably, the signal analysis unit has at least one computing unit for determining the operating state of the induction heating unit. The computing unit can comprise, for example, a microprocessor or the like.

It is further proposed that the cooktop accessory device has a control unit which is provided to change an operating state of at least one further unit as a function of the operating state of the induction heating unit determined by the signal analysis unit. An efficiency can be advantageously further improved by means of such an embodiment. Preferably, the control unit is provided to change automatically the operating state of the at least one further unit as a function of the operating state of the inductive heating unit determined by the signal analysis unit, in particular using presettings which can be changed by a user. Changing the operating state of the further unit can be, for example, switching on or switching off the further unit or changing from a first operating state of the further unit, for example an active operating state, into at least one second operating state which is different from the first, for example an inactive operating state and/or an idling operating state of the further unit. Preferably, an energy consumption of the further unit is lower in the inactive state than in the active operating state. Preferably, the energy consumption of the further unit is reduced further in the idling operating state relative to the inactive operating state. As a result, an energy efficiency of the cooktop accessory device can be advantageously improved. The control unit can be provided to change the operating state of the further unit and an operating state of at least one second further unit as a function of the operating state of the induction heating unit determined by the signal analysis unit. The control unit could set the further unit and the second further unit in different operating states from one another as a function of the operating state of the induction unit determined by the signal generation unit. For example, it might be conceivable that the control unit switches on the further unit and switches off the second further unit as a function of the operating state of the induction heating unit determined by the signal analysis unit.

The at least one further unit, the operating state thereof being changeable by the control unit as a function of the operating state of the induction heating unit determined by the signal analysis unit, could for example be part of the cooktop accessory having the cooktop accessory device. In an advantageous embodiment, however, it is proposed that the cooktop accessory device comprises the further unit which has at least one sensor element. An ease of use and/or a user experience can be advantageously improved for a user by means of such an embodiment. Preferably, the sensor element is provided to record at least one characteristic variable and/or a physical property, wherein the recording can take place actively, in particular by generating and emitting an electrical measuring signal, and/or passively, in particular by detecting changes to the properties of a sensor component of the sensor element. The sensor element of the further unit could be configured as a temperature sensor and/or as a volume sensor and/or as a weight sensor and/or as a different sensor appearing expedient to a person skilled in the art. It is conceivable that the further unit has further sensor elements which are configured differently from the sensor element and from one another and which are provided, in particular, for providing various further sensor functions. Alternatively or additionally to the further unit, the cooktop accessory device could have at least one second further unit which can be configured, in particular, differently from the further unit. For example, the further unit could be configured as a sensor unit and could have the at least one sensor element. The second further unit could be configured as a further sensor unit, in particular with at least one further sensor element which is different from the sensor element, or as a unit which is different from a sensor unit, for example as a control panel or as a stirring unit or as a different unit appearing expedient to a person skilled in the art.

It is further proposed that the parameter is an oscillation parameter of the inductive signal. If the parameter is an oscillation parameter, the operating state of the induction heating unit can be advantageously determined by means of the parameter in a particularly simple and/or rapid and/or reliable manner by the signal analysis unit. The oscillation parameter of the inductive signal could be, for example, a frequency and/or an amplitude and/or a duty cycle of the inductive signal. Alternatively, it might be conceivable for the parameter to be an electromagnetic parameter of the inductive signal which is different from an oscillation parameter, for example a voltage induced in the detection coil by the inductive signal and/or a current and/or an electrical and/or magnetic field strength of an electromagnetic field induced by the inductive signal in the detection coil, or the like.

It is further proposed that the signal analysis unit is provided to determine at least one further parameter of the inductive signal. As a result, a determination of the operating state of the induction heating unit can be advantageously further optimized. The further parameter could comprise, for example, a further oscillation parameter which is different from the oscillation parameter and/or a further electromagnetic parameter. In an advantageous embodiment, however, it is proposed that the further parameter comprises an activation sequence of the inductive signal. As a result, advantageously the operating state of the induction heating unit can be particularly accurately determined by the signal analysis unit. For controlling energy provided by the induction heating unit for the purpose of heating, a frequency of a high-frequency alternating current, by which the induction heating unit is operated, is usually varied. Preferably, the frequency of the high-frequency alternating current for operating the induction heating unit can be characterized by the oscillation parameter of the inductive signal. As an alternative or in addition to varying the frequency of the high-frequency alternating current, the energy provided by the induction heating unit can be varied by sequentially switching on and/or switching off the induction heating unit within individual time periods which can correspond, in particular, to parts or multiples of a period of a mains frequency of a power supply network by which the induction heating unit is supplied with electrical energy, wherein such a variation is preferably characterized by the activation sequence of the inductive signal.

It is further proposed that for a further processing of the inductive signal the signal analysis unit has at least one first low pass filter with a first limit frequency and at least one second low pass filter with a second limit frequency which is different from the first limit frequency. By means of such an embodiment, the inductive signal can be advantageously further processed for determining the parameter by simple technical means. Preferably, the first limit frequency of the first low pass filter is higher than a maximum frequency of a high-frequency alternating current by which the induction unit can be operated, in particular by an inverter. In particular, the first limit frequency is at least 80 kHz, advantageously at least 85 kHz, particularly advantageously at least 90 kHz, preferably at least 95 kHz and particularly preferably at least 100 kHz. Preferably, the second limit frequency of the second low pass filter is lower than the first limit frequency of the first low pass filter, particularly preferably lower than 27 kHz, and higher than a mains frequency of a power supply network which provides energy for supplying power to the induction heating unit. Preferably, the second limit frequency corresponds at least to twice the mains frequency of the power supply network which provides the energy for supplying power to the induction heating unit. The signal analysis unit preferably determines the parameter of the inductive signal by means of the first low pass filter and by means of the second low pass filter. Preferably, the first low pass filter is provided to generate a first analysis signal from the inductive signal. Preferably, the second low pass filter is provided to generate from the inductive signal a second analysis signal which is different from the first analysis signal. The signal analysis unit preferably has at least one comparator which is provided to compare the first analysis signal with the second analysis signal and to determine therefrom the parameter of the inductive signal. The comparator could be configured as an analog comparator. Preferably, the comparator is configured as a digital comparator and is particularly preferably integrated in the computing unit of the signal generation unit.

It is further proposed that the first low pass filter and the second low pass filter are arranged in a parallel circuit to one another. A circuit can be advantageously improved by means of such an embodiment. Moreover, it is proposed that for the further processing of the inductive signal the signal analysis unit has at least one third low pass filter with a third limit frequency which is different from the first limit frequency and the second limit frequency. Advantageously, a signal analysis can be further improved by means of such an embodiment. The third limit frequency of the third low pass filter is, in particular, lower than the second limit frequency of the second low pass filter, advantageously lower than the mains frequency of the power supply network which provides energy for supplying power to the induction heating unit. Preferably, the third limit frequency of the third low pass filter corresponds to a tenth of the mains frequency of the power supply network which provides the energy for supplying power to the induction heating unit. The third low pass filter is preferably arranged parallel to the first low pass filter and parallel to the second low pass filter. Preferably, the third low pass filter is provided to determine the further parameter. The signal analysis unit preferably determines the further parameter of the inductive signal by means of the second low pass filter and by means of the third low pass filter. Preferably, the third low pass filter is provided to generate from the inductive signal a third analysis signal which is different from the first analysis signal and from the second analysis signal. Preferably, the signal analysis unit has at least one further comparator which is provided to compare the second analysis signal with the third analysis signal and to determine therefrom the parameter of the inductive signal.

The invention further relates to a cooktop accessory, in particular an item of cookware or an underlay mat, comprising a cooktop accessory device, as claimed in one of the above-described embodiments. Such a cooktop accessory is characterized, in particular, by the aforementioned advantages of the cooktop accessory device.

A method for operating a cooktop accessory device is also proposed, wherein at least one inductive signal of at least one induction heating unit is detected and at least one parameter of the inductive signal is determined. As a result, a particularly simple and reliable method for determining at least one parameter of the inductive signal can be advantageously provided. The method is also characterized by an advantageously high level of efficiency.

The cooktop accessory device in this case is not intended to be limited to the above-described use and embodiment. In particular, the cooktop accessory device can have a different number of individual elements, components and units from a number mentioned herein for fulfilling a mode of operation described herein.

Further advantages emerge from the following description of the drawing. Exemplary embodiments of the invention are shown in the drawing. The drawing, the description and the claims contain numerous features in combination. The person skilled in the art will also expediently consider the features individually and combine them together to form further meaningful combinations.

DETAILED DESCRIPTION OF EXEMPLARY EMBODIMENTS OF THE PRESENT INVENTION

Figure 1:
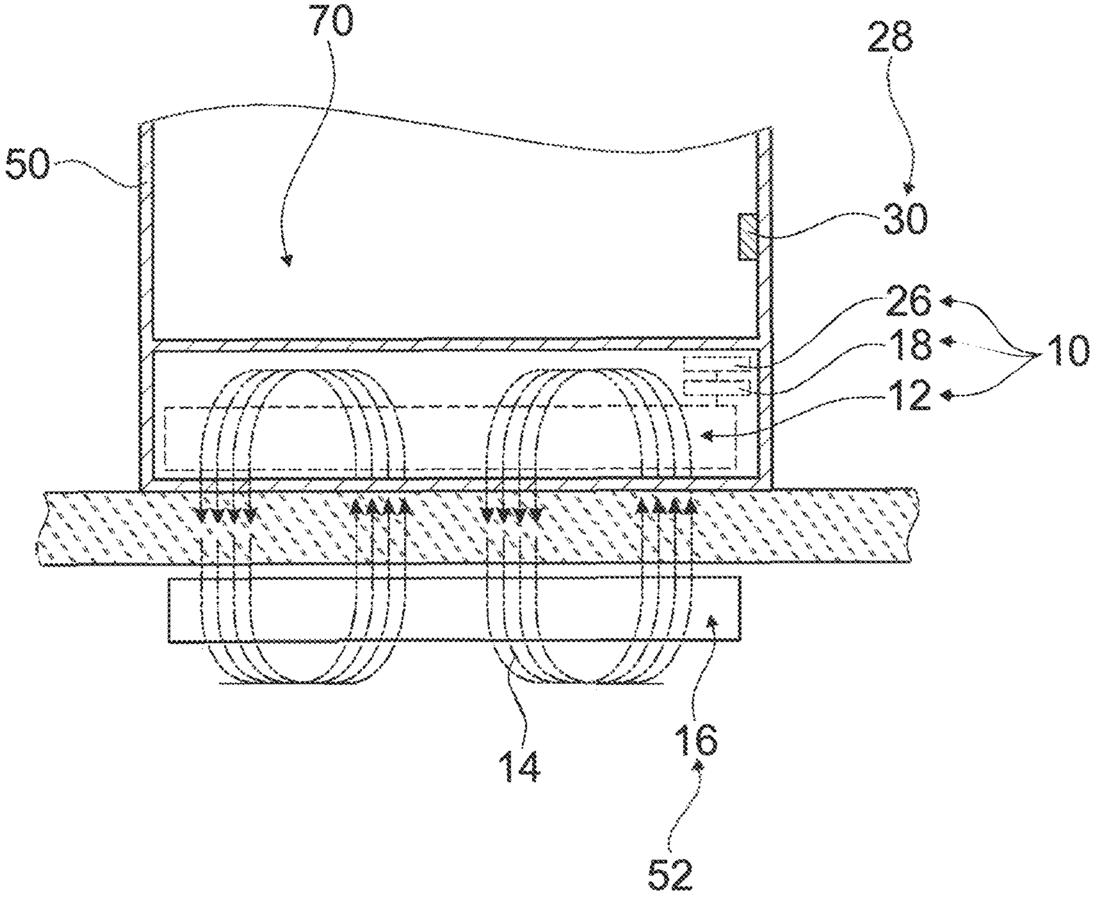
FIG. 1 shows a cooktop accessory with a cooktop accessory device, comprising a detection coil, a signal analysis unit, a control unit and a further unit in a schematic view.

FIG. 1 shows a schematic view of a cooktop accessory 50. The cooktop accessory 50 is configured as an item of cookware. In FIG. 1 the cooktop accessory 50 is positioned above an induction heating unit 16 of a cooktop 52. The induction heating unit 16 is provided to heat the cooktop accessory 50 which is configured as an item of cookware. In an operating state of the induction heating unit 16, the induction heating unit 16 provides at least one inductive signal 14 for heating the cooktop accessory 50 which is configured as an item of cookware.

The cooktop accessory 50 has a cooktop accessory device 10. The cooktop accessory device 10 comprises a detection coil 12. The detection coil 12 is provided to detect the at least one inductive signal 14.

The cooktop accessory device 10 has a signal analysis unit 18. The signal analysis unit 18 is provided to determine at least one parameter 20 of the inductive signal 14 (see FIG. 2).

The signal analysis unit 18 is electrically conductively connected to the detection coil 12. In the operating state of the induction heating unit 16, the inductive signal 14 is induced in the detection coil 12.

Figure 3:
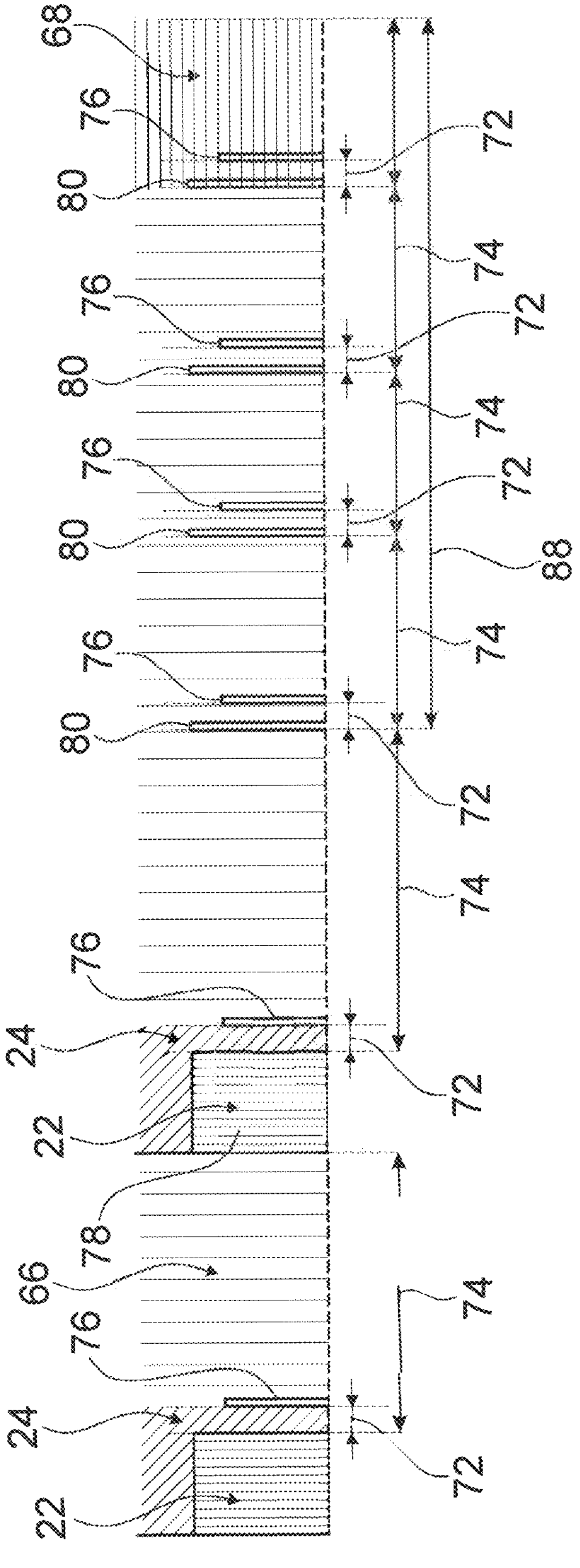
FIG. 3 shows a schematic diagram for illustrating a change of an operating state of the further unit by the control unit and FIG. 4 shows a schematic diagram for illustrating a method for operating the cooktop accessory device.

In the present case, the signal analysis unit 18 is provided to determine an operating state 22 of the induction heating unit 16 by means of the parameter 20 (see FIG. 3).

The cooktop accessory device 10 has a further unit 28. The further unit 28 is configured as a sensor unit and comprises at least one sensor element 30. In the present case, the sensor element 30 is configured as a temperature sensor. The sensor element 30 is arranged inside a food receiving space 70 of the cooktop accessory 50, which is configured as an item of cookware, and is provided for temperature measurement inside the food receiving space 70.

The cooktop accessory device 10 has a control unit 26. The control unit 26 is provided to change an operating state of the further unit 28 as a function of the operating state of the induction heating unit 16 determined by the signal analysis unit 18.

Figure 2:
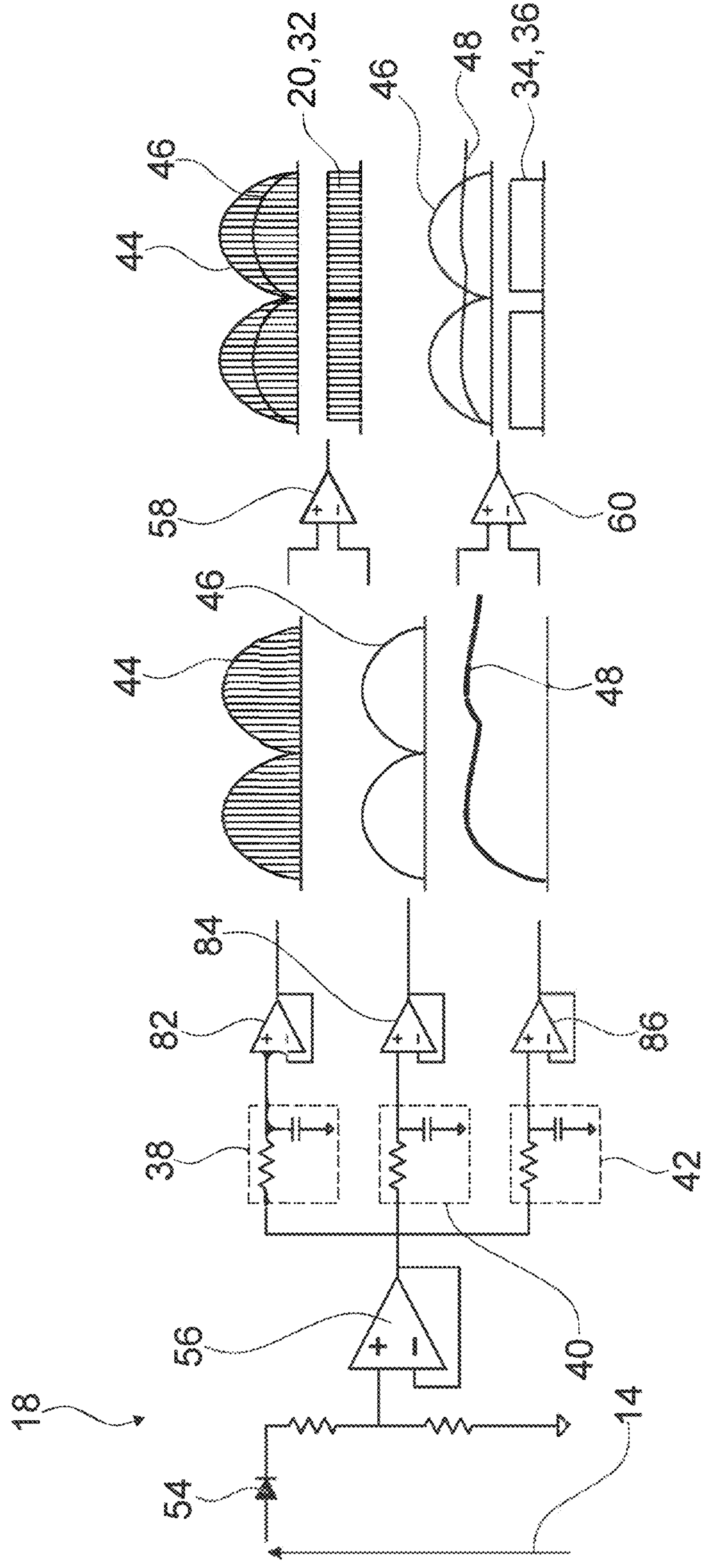
FIG. 2 shows a schematic electrical circuit diagram of the signal analysis unit with a first low pass filter, a second low pass filter and a third low pass filter.

FIG. 2 shows a schematic electrical circuit diagram of the signal analysis unit 18. The signal analysis unit 18 has a rectifier diode 54 by which the inductive signal 14, which is initially present as a bipolar signal with a periodically changing electrical polarity, is rectified.

The signal analysis unit 18 has an operational amplifier 56. The operational amplifier 56 is electrically connected downstream of the rectifier diode 54 and is provided to amplify the inductive signal 14 which is rectified by the rectifier diode 54.

The signal analysis unit 18 has a first low pass filter 38 for the further processing of the inductive signal 14. The first low pass filter 38 has a first limit frequency. The signal analysis unit 18 has a second low pass filter 40 for the further processing of the inductive signal 14. The second low pass filter 40 has a second limit frequency. The second limit frequency of the second low pass filter 40 is different from the first limit frequency of the first low pass filter 38. The first low pass filter 38 and the second low pass filter 40 are arranged in a parallel circuit to one another.

The signal analysis unit 18 has a third low pass filter 42. The third low pass filter 42 has a third limit frequency. The third limit frequency of the third low pass filter 42 is different from the first limit frequency of the first low pass filter 38 and from the second limit frequency of the second low pass filter 40. In the present case, the first limit frequency of the first low pass filter 38 is higher than a maximum frequency of an alternating current by which the induction heating unit 16 can be operated. For example, the induction heating unit 16 could be operated with a high-frequency alternating current at a maximum frequency of 75 kHz and the first limit frequency of the first low pass filter 38 could be, for example, 100 kHz.

In the present exemplary embodiment, the second limit frequency of the second low pass filter 40 is lower than the first limit frequency of the first low pass filter 38 and higher than a mains frequency of a power supply network (not shown) which provides energy for supplying power to the induction heating unit 16. In the present case, the second limit frequency of the second low pass filter 40 corresponds to twice the mains frequency of the power supply network and could be 100 Hz, for example, at a mains frequency of 50 Hz. In the present case, the third limit frequency of the third low pass filter 42 is lower than the second limit frequency of the second low pass filter 40 and lower than the mains frequency. The third limit frequency of the third low pass filter 42 could be 5 Hz, for example.

The first low pass filter 38 generates a first analysis signal 44 from the inductive signal 14. The signal analysis unit 18 has a first impedance converter 82. The first impedance converter 82 is connected to a computing unit (not shown) of the signal analysis unit 18 and converts the first analysis signal 44 into a form which is compatible with an input voltage of the computing unit. The second low pass filter 40 generates a second analysis signal 46 from the inductive signal 14. The signal analysis unit 18 has a second impedance converter 84 which correspondingly converts the second analysis signal 46 into a form which is compatible with an input voltage of the computing unit. The third low pass filter 42 generates a third analysis signal 48 from the inductive signal 14. The signal analysis unit 18 has a third impedance converter 86 which correspondingly converts the third analysis signal 48 into a form which is compatible with an input voltage of the computing unit.

The signal analysis unit 18 has a comparator 58. In an operating state of the signal analysis unit 18, the comparator 58 compares the first analysis signal 44 with the second analysis signal 46 and determines therefrom the parameter 20 of the inductive signal 14. The parameter 20 is an oscillation parameter 32 of the inductive signal 14. In the present case, the oscillation parameter 32 is the frequency of the high-frequency alternating current by which the induction heating unit 16 is operated.

The signal analysis unit 18 is provided to determine a further parameter 34 of the inductive signal 14.

The signal analysis unit 18 has a further comparator 60. In the operating state of the signal analysis unit 18, the further comparator 60 compares the second analysis signal 46 with the third analysis signal 48 and determines therefrom the further parameter 34 of the inductive signal 14.

The comparator 58 and the further comparator 60 are part of the computing unit (not shown) of the signal analysis unit 18.

The further parameter 34 comprises an activation sequence 36 of the inductive signal 14. The activation sequence 36 of the inductive signal 14 describes a sequence of time periods in which the induction heating unit 16 is either switched on or off, for the purpose of varying an energy provided to the cooktop accessory 50.

FIG. 3 shows a schematic diagram for illustrating by way of example a time curve of the operating state 22 of the induction heating unit 16 determined by the signal analysis unit 18. In the operating state 22 of the induction heating unit 16, the further unit 28 is in an active operating state 24. As soon as the operating state 22 of the induction heating unit 16 determined by the signal analysis unit 18 changes, a first control period 72 starts. During the first control period 72, the further unit 28 is also in the active operating state 24. The first control period 72 can correspond to a multiple of a period of a mains voltage of a power supply network (not shown). For example, the first control period 72 could correspond to three times the period of the mains voltage and last for a time period of three milliseconds at a mains frequency of 50 Hz.

After the elapse of the first control period 72 the control unit 26 obtains first status information 76 relative to the operating state 22 of the induction heating unit 16 from the signal analysis unit 18. If the first status information 76 comprises that the induction heating unit 16 was inactive during the control period 72, using the operating state 22 of the induction heating unit 16 determined by the signal analysis unit 18 the control unit 26 changes the operating state 22 of the further unit 28 from the active operating state 24 into an inactive operating state 66. In the inactive operating state 66 an energy consumption of the further unit 28 is reduced.

After the elapse of a second control period 74 which includes the first control period 72, and which corresponds to a multiple of the first control period 72, for example a duration of at least 2 seconds, the control unit 26 obtains further status information which can be either first further status information 78 or second further status information 80. The first further status information 78 comprises a change of the operating state 22, in the present case a renewed start-up of the induction heating unit 16. Using the first further status information 78 the control unit 26 changes the operating state of the further unit 28 from the inactive operating state 66 into the active operating state 24.

The second further status information 80 comprises no change of the operating state 22 of the induction heating unit 16 determined by the signal analysis unit 18. During a third control period 88, which in turn corresponds to a multiple of the second control period 74, the control unit 26 regularly obtains status information from the signal analysis unit 18. If during the third control period 88 the control unit 26 obtains the status information 76 and the second further status information 80 from the signal analysis unit 18 repeatedly in succession, in the present case for example three times in succession, the control unit 26 changes the operating state of the further unit 28 from the inactive operating state 66 into an idling operating state 68. In the idling operating state 68 an energy consumption of the further unit 28 is further reduced relative to the inactive operating state 66.

Figure 4:
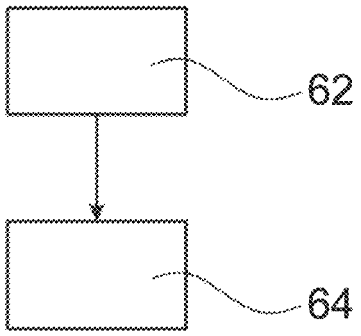

FIG. 4 shows a schematic diagram for illustrating a method for operating the cooktop accessory device 10. In the method, the at least one inductive signal 14 of the at least one induction heating unit 16 is detected and at least the parameter 20 of the inductive signal 14 is determined. The method comprises a method step 62. In the method step 62, the inductive signal 14 is detected and namely by means of the detection coil 12 (see FIG. 1).

The method comprises a further method step 64. In the further method step 64, at least the parameter 20 is determined. In the further method step 64, the inductive signal 14 is initially rectified and namely by means of the rectifier diode 54 of the signal analysis unit 18.

In the further method step 64, the rectified inductive signal 14 is then amplified and namely by means of the operational amplifier 56 of the signal analysis unit 18. From the rectified and amplified inductive signal, the first analysis signal 44 is then generated by means of the first low pass filter 38 of the signal analysis unit 18. At the same time, the second analysis signal 46 is generated by means of the second low pass filter 40 of the signal analysis unit 18, and the third analysis signal 48 is generated by means of the third low pass filter 42 of the signal analysis unit 18. Then in the further method step 64, the first analysis signal 44 is compared with the second analysis signal 46, and namely by means of the comparator 58 of the signal analysis unit 18, and the parameter 20 of the inductive signal 14 is determined therefrom. At the same time, in the further method step 64 the second analysis signal 46 is compared with the third analysis signal 48, and namely by means of the further comparator 60, and the further parameter 34 is determined therefrom.

The invention claimed is:

1. A cooktop accessory device, comprising:

a detection coil configured to detect an inductive signal of an induction heating unit; and a signal analyzer configured to determine a parameter of the inductive signal, wherein the signal analyzer is configured to determine a further parameter of the inductive signal, and the further parameter comprises an activation sequence of the inductive signal.

2. The cooktop accessory device of claim 1, wherein the signal analyzer is configured to determine an operating state of the induction heating unit based on the parameter.

3. The cooktop accessory device of claim 2, further comprising;

a further unit; and a control unit configured to change an operating state of the further unit as a function of the operating state of the induction heating unit determined by the signal analyzer.

4. The cooktop accessory device of claim 3, wherein the further unit comprises a sensor element.

5. The cooktop accessory device of claim 1, wherein the parameter is an oscillation parameter of the inductive signal.

6. The cooktop accessory device of claim 1, wherein for a further processing of the inductive signal the signal analyzer comprises a first low pass filter with a first limit frequency and a second low pass filter with a second limit frequency which is different from the first limit frequency.

7. The cooktop accessory device of claim 6, wherein the first low pass filter and the second low pass filter are arranged in a parallel circuit to one another.

8. The cooktop accessory device of claim 6, wherein for the further processing of the inductive signal the signal analyzer comprises a third low pass filter with a third limit frequency which is different from the first limit frequency and the second limit frequency.

9. The cooktop accessory device of claim 1, embodied as an item of cookware or an underlay mat.

10. A method for operating a cooktop accessory device, the method comprising:

detecting an inductive signal of an induction heating unit;

determining a parameter of the inductive signal; and determining an activation sequence of the inductive signal.

11. The method of claim 10, further comprising determining an operating state of the induction heating unit based on the parameter.

12. The method of claim 10, further comprising changing an operating state of a further unit as a function of the operating state of the induction heating unit.

13. The method of claim 10, wherein the parameter is an oscillation parameter of the inductive signal.

14. The method of claim 10, further comprising:

generating with a first low pass filter a first analysis signal from the inductive signal;

generating with a second low pass filter a second analysis signal from the inductive signal; and comparing the first analysis signal with the second analysis signal to determine the parameter of the inductive signal.

15. The method of claim 14, further comprising arranging the first low pass filter and the second low pass filter in a parallel circuit to one another.

* * * * *